United States Patent [19]

Hillman et al.

[11] Patent Number: 5,400,340
[45] Date of Patent: Mar. 21, 1995

[54] END OF PACKET DETECTOR AND RESYNCHRONIZER FOR SERIAL DATA BUSES

[75] Inventors: Daniel L. Hillman, San Jose; Michael Teener, Santa Cruz, both of Calif.

[73] Assignee: Apple Computer, Inc., Cupertino, Calif.

[21] Appl. No.: 26,517

[22] Filed: Mar. 4, 1993

[51] Int. Cl.6 .............................................. H04L 7/04
[52] U.S. Cl. .................. 370/105.3; 370/108; 375/118
[58] Field of Search ............... 370/61, 100.1, 105.3, 370/108, 94.1; 375/118

[56] References Cited

U.S. PATENT DOCUMENTS

| | | | |
|---|---|---|---|
| 4,429,386 | 1/1984 | Graden | 370/108 X |
| 4,748,588 | 5/1988 | Norman et al. | 395/550 |
| 4,873,703 | 10/1989 | Crandall et al. | 375/118 |
| 4,884,286 | 11/1989 | Szcdzepanek et al. | 370/108 X |
| 4,891,788 | 1/1990 | Kreifels | 375/118 X |
| 4,933,932 | 6/1990 | Quinguis et al. | 370/94.1 X |
| 4,945,548 | 7/1990 | Iannarone et al. | 370/102 X |
| 4,964,142 | 10/1990 | Annamalai | 370/105.3 X |

*Primary Examiner*—Melvin Marcelo
*Attorney, Agent, or Firm*—Fliesler, Dubb, Meyer & Lovejoy

[57] ABSTRACT

An interface device for a point-to-point connected serial bus in which bus clock and bus data transmissions on the bus cease between transmissions of packets of data, includes a low latency resynchronizing circuit and an end of packet detector which is independent of control data within the packet. The resynchronizer is based on an interface which receives bus data and bus clock from a transmission of a packet on the bus. A circular input buffer stores bus data received from the bus in data locations indicated by an input pointer in response to the bus clock. An input pointer generator supplies the input pointers to the input buffer in a circular sequence, beginning in a particular location during a first bus clock in a packet. An output selector supplies bus data from one of the N data locations in the input buffer to the selector output in response to an output pointer and in response to the local clock. An output pointer generator supplies the output pointer in a circular sequence beginning in the particular location in a local clock cycle after the first bus clock in the packet. The end of packet is detected using a comparator coupled to the input pointer generator and the output pointer generator. When the input pointer and the output pointer match, the end of the data packet is indicated. The overrun only occurs after the bus clock has stopped at the end of the packet which stops the output pointer generator.

15 Claims, 3 Drawing Sheets

END OF PACKET DETECTOR AND RESYNCHRONIZER FOR SERIAL DATA BUSES

BACKGROUND OF THE INVENTION

1. Field of the Invention

The present invention relates to systems for reliable data transfer between different devices; more particularly to high speed serial, point-to-point connected bus systems, in which resynchronization of the serial data stream is required.

2. Description of Related Art

In point-to-point connected bus systems, like the IEEE proposed standard P1394, packets of data are transmitted from one device to the next, with the transmitter's clock combined with the data according to any one of plurality of encoding techniques. Between transmissions of packets of data, the clock and data transmissions stop. Thus the receiver is unable to maintain a clock synchronized with other devices on the bus, and must resynchronize the transmission with its local clock. The transmitter and receiver clocks work at the same nominal frequency plus or minus a tolerance, and with an arbitrary phase relationship.

Resynchronization increases the latency of data transfers, by requiring several clock cycles at each station to perform the resynchronization function before retransmission of the data packet to another station along the string, or use of the data packet by the local station. When a given packet is transmitted along a bus through a number of nodes, the resynchronization latency can add up significantly.

Also, in systems in which data and clock transmissions cease between transmissions of packets, it is critically important to detect an end of a packet of data at the receiving station. Prior art systems rely on control fields within the packets of data themselves to indicate the length of the packet and thus when the end of the packet can be expected to occur.

The control fields in the packets of data extend the length of transmissions on the bus by the length of the control field. This can be significant for systems in which there are numerous transmissions which are short enough that the length of the control field indicating the packet length or end-of-packet becomes a significant portion of the actual packet transmitted. Thus, the control field contributes to the latency between a decision to send data to a receiving station, and the actual time the receiving station has the data to use.

Accordingly, it is desirable to provide a high speed serial bus system which uses a low latency resynchronization circuit and which minimizes the latency and complexity involved in end of packet detection.

SUMMARY OF THE INVENTION

The present invention provides an interface device for a point-to-point connected serial bus in which bus clock and bus data transmissions on the bus cease between transmissions of packets of data, including a low latency resynchronizing circuit and an end of packet detector which is independent of control data within the packet. The end of packet detector is coupled with the resynchronizer, and detects the end of packet in the same local clock cycle on the receiving device that the last data of the packet is resynchronized with the local clock. Thus, the latency involved in end of packet detection and resynchronization is greatly improved over prior art systems.

According to further aspects of the invention, the interface device includes the logic for transmitting resynchronized data on the bus or accepting resynchronized data for local processing in response to control data in the packet. Furthermore, error detection logic is included which detects errors in the resynchronized data accepted for local processing in response to control data such as error correcting codes in the packet.

The resynchronizer according to the present invention is based on an interface which receives bus data and bus clock from a transmission of a packet on the bus. An input buffer having N locations stores bus data received from the bus in data locations indicated by an input pointer in response to the bus clock. An input pointer generator supplies the input pointers to the input buffer indicating one of the N data locations in a circular sequence for storage of bus data in response to the bus clock, beginning in a particular location during a first bus clock in a packet.

An output selector, having a selector output and N inputs coupled to the N data locations in the input buffer, supplies bus data from one of the N data locations in the input buffer to the selector output in response to an output pointer and in response to the local clock. An output pointer generator supplies the output pointer indicating one of the N data locations in a circular sequence for output of bus data in response to the local clock beginning in the particular location in a local clock cycle after the first bus clock in the packet.

The end of packet is detected using a comparator coupled to the input pointer generator and the output pointer generator. When the input pointer and the output pointer match, indicating that the output pointer has overrun the input pointer, the end of the data packet is indicated. The end of packet detector is used to reset the input pointer generator and the output pointer generator to the particular location, and otherwise initialize the interface device for receiving a next packet. The overrun of the input pointer with the output pointer only occurs after the bus clock has stopped at the end of the packet which stops the output pointer generator. Thus, the end of packet is detected in the same local clock cycle, as the last data in the packet is resynchronized to the local clock.

The resynchronizer further includes logic for establishing the timing between the input pointer generator and the output pointer generator, such that first data of a packet is supplied resynchronized to the local clock in two or less local clock cycles after the first bus clock cycle.

Other aspects and advantages of the present invention can be seen upon review of the drawings, the detailed description in the claims which follow.

DESCRIPTION OF THE PREFERRED EMBODIMENTS

A detailed description of a preferred embodiment of the present invention is provided with respect to the FIGS. 1 through 4.

Figure 1:
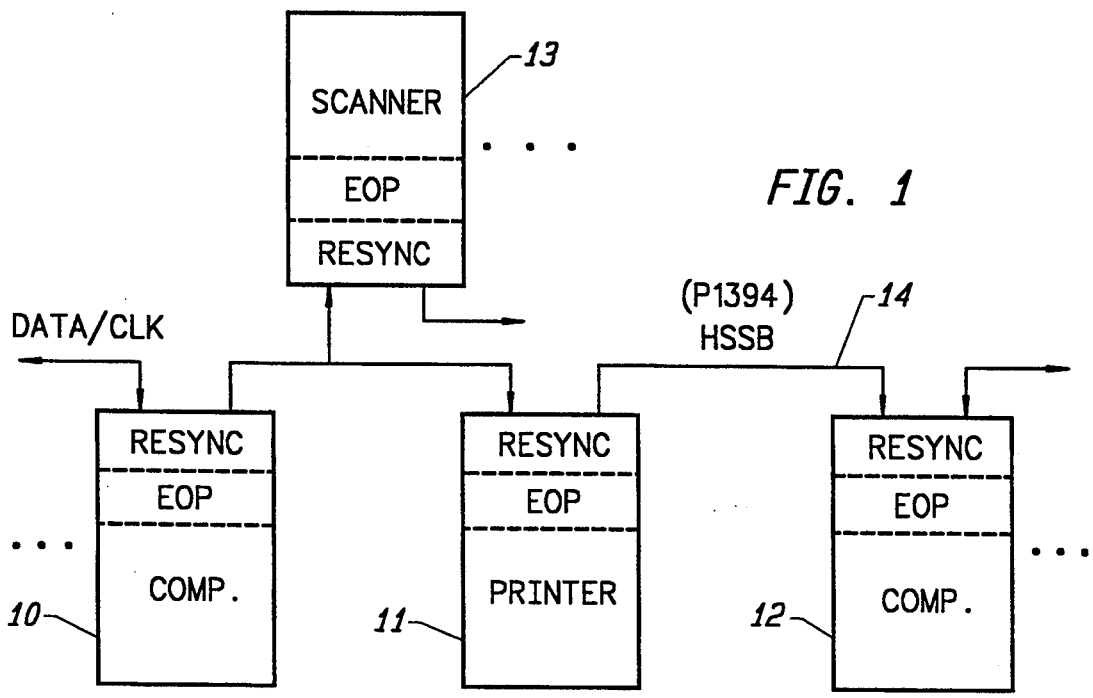
FIG. 1 is an overview block diagram of a point-to-point serial bus system according to the present invention.

FIG. 1 illustrates a computer system having a plurality of processing nodes on a point-to-point connected bus according to the present invention. The system includes processing nodes 10, 11, 12 and 13 which comprise for example a computer, a printer, a computer and a scanner respectively. A high speed serial bus 14, such as IEEE proposed standard bus P1394, interconnects the nodes 10 through 13 in a point-to-point configuration. Thus, a packet transmitted by one node goes directly to one or more second nodes. Each of the nodes which receive the signal then retransmits it to other nodes in the system or uses it locally.

In a bus according to the present invention, the data and clock of a packet of data are transmitted across the bus in a serial fashion with a header which includes a number of control fields and a field for storing error detection codes, which are used for packet routing and ensuring reliability of transmissions on the bus. Between packets, the data and clock transmissions are stopped. Thus, every interface such as interface 10, includes a resynchronization circuit (RESYNCH) and an end of packet detector (EOP) which is coupled with the resynchronization circuit according to the present invention and operates independently of control fields in the packets.

Figure 2:
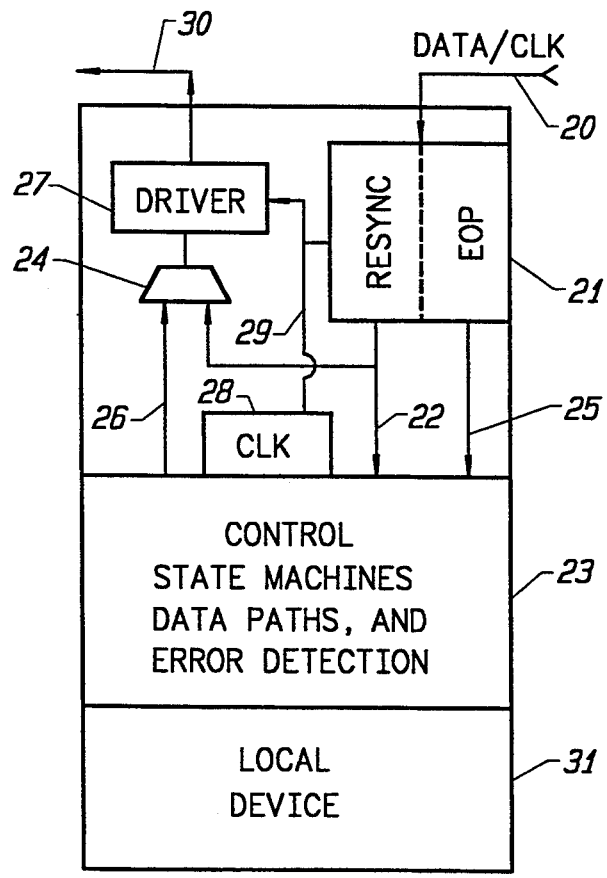
FIG. 2 is a schematic block diagram of a bus interface device according to the present invention.

FIG. 2 provides a heuristic block diagram of a node on the bus system of FIG. 1. As can be seen, incoming signals are received by the node on line 20. The received signals are separated into data and bus clock, and supplied to resynchronization and end of packet detector logic 21. Resynchronized data is supplied on line 22 to control state machines, data paths and error detection logic, generally 23, on the node. Also, the resynchronized data is supplied on line 22 to multiplexer 24. The end of packet detector in logic 21 supplies an end of packet signal on line 25 to the control state machine, data paths and error detection logic 23. Also the control state machines, data paths and error detection logic 23 supply output data on line 26 to multiplexer 24. Under control of the state machine, the multiplexer 24 supplies data to output driver 27. Also, a local clock source 28 generates a local clock signal on line 29 which is connected to the resynchronization and end of packet detection logic 21 and to the output driver 27. The output driver 27 combines the data and clock using an encoding scheme for transmitting data and clock on a single line, such as MFM, NRZ or the like. The output data and clock are then driven onto the bus across line 30. The control state machines, data paths and error detection logic 23 monitor the control fields in the incoming packets and determine whether the packet should be retransmitted or accepted for local processing at a local device 31. Also, the control state machines, data paths and error detection logic 23 package data for transmission from the local device 31 onto the bus.

The local clocks 28 on all nodes operate at nominally the same frequency, but with an arbitrary phase relationship. Thus, any given clock in the network may be slightly slower or faster than the clock of its neighbors. For a high speed serial bus such as the IEEE P1394, the clock may operate at 100 Mhz, 200 Mhz, or up to 400 Mhz. The accuracy of the clock is plus or minus 0.01% for crystal oscillators running at about 100 Mhz using state of the art components. Therefore, a local clock may be operating at a rate of 0.02% faster or slower than the clock on the bus so that during a long transmission, the clock edges of the local clock will tend to overrun (or be overrun by) the clock transitions on the bus clock. If the transitions have a phase relationship which is very close to one another, a potential error condition is encountered. A resynchronization circuit according to the present invention minimizes or eliminates this error possibility. Also, the resynchronization circuit according to the present invention provides an end of packet detection which is independent of control fields in the data packets.

Figure 3:
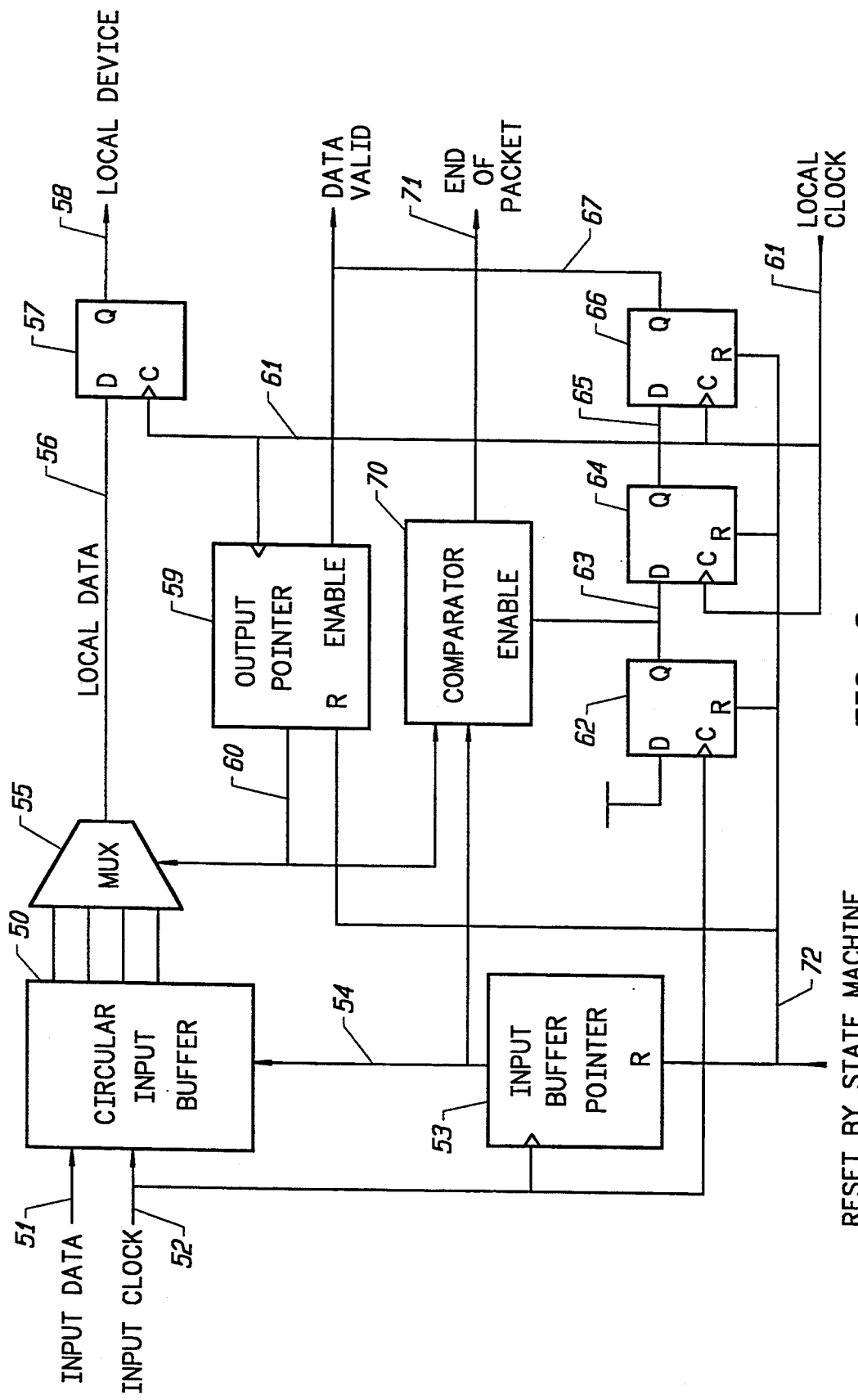
FIG. 3 is a functional block diagram of a resynchronizer and end of packet detector according to the present invention.
Figure 4:
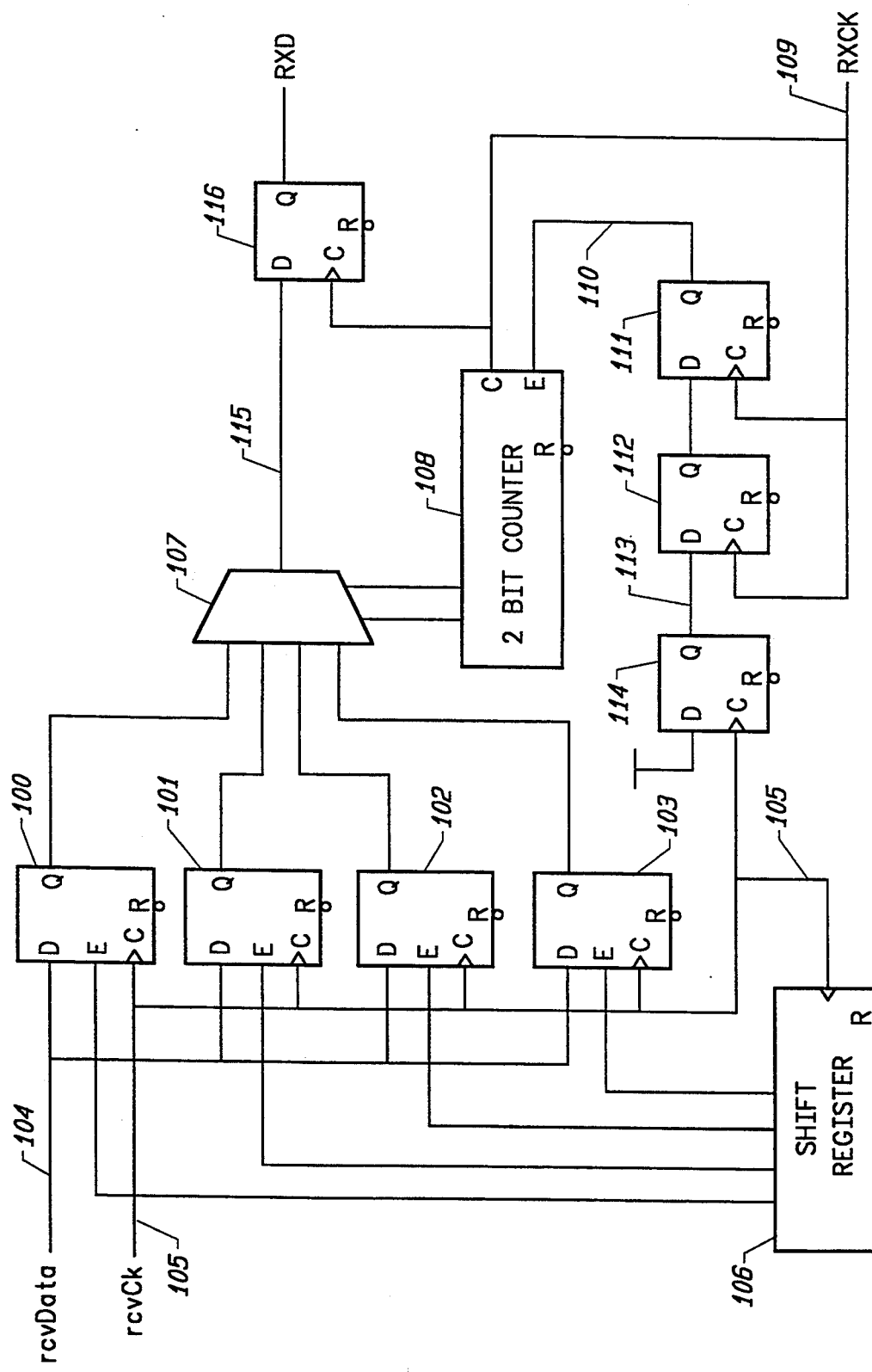
FIG. 4 is a more detailed schematic diagram of the resynchronization circuit according to the present invention.

FIG. 3 is a schematic block diagram of the end of packet detector/resynchronizer according to the present invention. The circuit includes a circular input buffer 50 which receives input data on line 51 and input clock on line 52. An input pointer generator 53 supplies an input pointer on line 54 to the circular input buffer 50. The input pointer generator 53 and the circular input buffer 50 are clocked by the input bus clock 52. Pointers are generated by the input buffer pointer generator 53 in a circular fashion to store the input data 51 in a sequence of data locations in the circular input buffer. In one embodiment, there may be four data locations in the circular input buffer 50 as shown in FIG. 4. However, the number of data locations can be varied as suits the needs of a particular application, and as explained in more detail below. The four outputs of the circular input buffer 50 are supplied to a 4 to 1 multiplexer 55. The output of the 4 to 1 multiplexer is supplied on line 56 as local data, The local data 56 is supplied to a flip-flop 57 or other structure in the local device for receiving the local data. Thus, the output of the flip-flop 57 is supplied on line 58 for processing in the local device.

The multiplexer 55 is controlled by an output pointer logic 59. The output pointer logic 59 generates an output pointer on line 60 in a circular fashion to select a particular input of the multiplexer 55 for supply as local data on line 56. The output pointer 59 is clocked via line 61 by the local clock.

The bus clock on line 52 is used to clock flip-flop 62. The input to flip-flop 62 is pulled high so that upon the first bus clock, a high packet start signal is generated on line 63. The packet start signal on line 63 is supplied as input to flip-flop 64. Flip-flop 64 is clocked by the local clock on line 61. The output of flip-flop 64 is supplied on line 65 as input to flip-flop 66. Flip-flop 66 is clocked by the local clock on line 61. The output of flip-flop 66 is supplied as an increment enable signal on line 67 to an enable input on output pointer logic 59. Also, the signal line 67 may be used as a data valid signal indicating when the local data on line 56 is valid. This data valid signal may thus be used for determining when to accept data in flip-flop 57, or otherwise as suits the needs of a particular application. Thus, on the first bus clock, a packet start on line 63 is asserted high. On the first local clock, after the first bus clock, line 65 is asserted high. On the second local clock, after the first bus clock, the data valid signal on line 67 is asserted and the output pointer logic 59 is enabled.

Both the input pointer generator 53 and the output pointer logic 59 are initialized to point to the same data location in the circular input buffer 50, such as location 0. When the data valid signal is inserted on line 67, multiplexer 55 will be selecting data out of location 0 in the circular input buffer, on to the local data line 56. Also, the output pointer 59 will increment. On the next local clock signal, the multiplexer 55 will select data location 1 and the output pointer will increment. This sequence will repeat in a circular fashion until the end of the packet.

The resynchronizing circuit shown in FIG. 3 detects the end of the packet using comparator 70. The inputs to comparator 70 include the input pointer on line 54 and the output pointer on line 60. When they match, then the end of the packet is signaled on line 71. The end of packet signal 71 is used by the state machines to indicate that the resynchronizing device should be reset by asserting the signal on line 72. This has the effect of pulling the signal on line 63 low. The packet start signal on line 63 is connected to an enable input of the comparator 70. Thus, the comparator is disabled after the resynchronizing circuit is reset.

Because of the delay set in to the sequence of registers 62, 64, 66, the output pointer will lag the input pointer by about two local clock cycles at the beginning of a packet. Even if the bus clock and the local clock drift toward one another, this margin in the positions of the input and output pointers provides protection from an enormous overrun condition. If very long data packets are used, a greater margin may be added to the circuit by increasing the number of registers in the string of registers 64 and 66 and by providing a larger circular input buffer 50.

As can be seen, the resynchronizer of FIG. 3 provides resynchronized data two local clock cycles after the first bus clock in a packet. This provides very efficient, low latency resynchronization of data being transferred on the bus. In addition, the end of packet signal on line 71 is generated independent of control fields in the packet and in the same cycle that the last valid data of the packet is accepted. Again, this is a very efficient, low latency determination of the end of packet, because of the short amount of time needed on the local device to detect the end of packet, and the ability to use shorter packets, without a packet length field.

FIG. 4 illustrates in more detail an implementation of the resynchronization circuitry used in the system of FIG. 3. In this embodiment, the circular input buffer consists of registers 100, 101, 102 and 103. Each of registers 100 through 103 is connected to receive data from the bus on line 104. Each is clocked by the bus clock on line 105. Each is enabled by the respective outputs of a shift register 106 supplying the input buffer pointer. The shift register 106 is also clocked by the received bus clock on line 105. A shift register is used as the input buffer pointer because it is very fast and simple to implement. An alternative embodiment may use a two-bit counter with a decoder, or other circular addressing schemes.

The outputs of the flip-flops 100 through 103 are supplied to multiplexer 107. Multiplexer 107 is controlled by a two-bit counter 108 which is clocked by the local clock on 109 and enabled by the increment enable signal on line 110. The increment enable/data valid signal on line 110 is driven by register 111 which is clocked by the local clock on line 109. The input to register 111 is the output of register 112, which is driven by the local clock on line 109. The input of register 112 is the packet start signal on line 113 generated by register 114. The input to register 114 is pulled high on the first bus clock on line 105. Received data on line 115 is available at the output of multiplexer 107 for latching in register 116 on the local device under control of the local clock 109. All the flip-flops, and the shift register and counter may be cleared at the end of the packet or otherwise under control of local state machines, as mentioned above.

As can be seen, a simple, and reliable system for resynchronizing data on a high speed serial bus in which clock and data cease between packets has been provided. In addition, end of packet detection is accomplished independent of any control fields in the packets. Interface devices using this circuitry are particularly suited to high speed serial buses such as the proposed IEEE P1394.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An interface device for a point to point connected serial bus in which bus clock and bus data transmissions on the bus cease between transmission of packets of data, comprising:

a local clock source to supply a local clock;
means, coupled to the bus and receiving the local clock, for resynchronizing data on the bus with the local clock, including;
    means, connected to the bus, for receiving bus data and bus clock from a transmission of a packet on the bus;
    an input buffer, coupled to the means for receiving, having N data locations to store bus data received from the bus in a data location indicated by an input pointer in response to the bus clock;
    an input pointer generator, coupled to the means for receiving and the input buffer, to supply the input pointer to the input buffer indicating one of the N data locations in a circular sequence for storage of bus data in response to the bus clock beginning in a particular location during a first bus clock in a packet;
    an output selector, having a selector output and N inputs coupled to the N data locations in the input buffer, to supply bus data from one of the N data locations in the input buffer to the selector output in response to an output pointer; and
    an output pointer generator, coupled to the means for receiving and the local clock source, to supply an output pointer indicating one of the N data locations in a circular sequence for output of bus data in response to the local clock beginning in the particular location in a local clock cycle after the first bus clock in the packet; and
means, coupled to the bus, for detecting an end of a packet of data independent of control data in the packet.

2. The interface device of claim 1, further including:
means, coupled to the means for resynchronizing, for transmitting resynchronized data on the bus or accepting resynchronized data for local processing in response to control data in the packet.

3. The interface device of claim 2, further including:
means, coupled to the means for resynchronizing, for detecting errors in a packet of resynchronized data accepted for local processing in response to control data in the packet.

4. The interface device of claim 1, wherein the means for detecting an end of a packet includes:
means, coupled to the input pointer generator an the output pointer generator, for indicating an end of a packet in response to a match of the input pointer and the output pointer.

5. An interface device for a point to point connected serial bus in which bus clock and bus data transmissions on the bus cease between transmission of packets of data, comprising:
a local clock source to supply a local clock;
means, coupled to the bus and receiving the local clock, for resynchronizing data on the bus with the local clock, including
means, connected to the bus, for receiving bus data and bus clock from a transmission of a packet on the bus;
an input buffer, coupled to the means for receiving, having N data locations to store bus data received from the bus in a data location indicated by an input pointer in response to the bus clock;
an input pointer generator, coupled to the means for receiving and the input buffer, to supply the input pointer to the input buffer indicating one of the N data locations in a circular sequence for storage of bus data in response to the bus clock beginning in a particular location during a first bus clock in a packet;
an output selector, having a selector output and N inputs coupled to the N data locations in the input buffer, to supply bus data from one of the N data locations in the input buffer to the selector output in response to an output pointer; and
an output pointer generator, coupled to the means for receiving and the local clock source, to supply an output pointer indicating one of the N data locations in a circular sequence for output of bus data in response to the local clock beginning in the particular location in a local clock cycle after the first bus clock in the packet;
means, coupled to the means for resynchronizing, for transmitting resynchronized data on the bus or accepting resynchronized data for local processing in response to control data in the packet;
means, coupled to the means for resynchronizing, for detecting an end of a packet of data independent of control data in the packet; and
means, coupled to the means for resynchronizing and the means for detecting an end of a packet, for detecting errors in a packet of resynchronized data accepted for local processing in response to control data in the packet.

6. The interface device of claim 5, wherein the means for detecting an end of a packet includes:
means, coupled to the input pointer generator and the output pointer generator, for indicating an end of a packet in response to a match of the input pointer and the output pointer.

7. An interface device for a point to point connected serial bus in which bus clock and bus data transmissions on the bus cease between transmission of packets, comprising:
means, connected to the bus, for receiving bus data and bus clock from a transmission of a packet on the bus;
an input buffer, coupled to the means for receiving, having N data locations to store bus data received from the bus in a data location indicated by an input pointer in response to the bus clock;
an input pointer generator, coupled to the means for receiving and the input buffer, to supply the input pointer to the input buffer indicating one of the N data locations in a circular sequence for storage of bus data in response to the bus clock beginning in a particular location during a first bus clock in a packet;
a local clock source supplying a local clock;
an output selector, having a selector output and N inputs coupled to the N data locations in the input buffer, to supply bus data from one of the N data locations in the input buffer to the selector output in response to an output pointer;
an output pointer generator, coupled to the means for receiving and the local clock source, to supply an output pointer indicating one of the N data locations in a circular sequence for output of bus data in response to the local clock beginning in the particular location in a local clock cycle after the first bus clock in the packet; and
comparator means, coupled to the input pointer generator and the output pointer generator, for indicating an end of a packet, and resetting the input pointer and the output pointer to the particular location in response to a match of the input pointer and the output pointer.

8. The interface device of claim 7, including:
means, coupled to the bus clock and the local clock, for enabling the output pointer generator to increment after the first bus clock in a packet and in synchronization with the local clock.

9. The interface device of claim 8, wherein the means for enabling includes:
first means for asserting a packet start signal in response to the bus clock;
a first register, coupled to receive the packet start signal from the first means and to the local clock, for registering the packet start signal on a first local clock after the packet start signal; and
a second register, coupled to receive the packet start signal from the first register and to the local clock, for registering the packet start signal on a second local clock after the packet start signal to produce an increment enable signal; and
means, coupled with the output pointer generator, for enabling the output pointer generator to increment in response to the increment enable signal.

10. The device of claim 7, including:
means, coupled to the bus clock and the comparator means, for enabling the comparator means on the first bus clock of a packet.

11. The device of claim 10, wherein the means for enabling is responsive to a packet start signal and includes means for asserting a packet start signal in response to the first bus clock in a packet.

12. The device of claim 7, wherein the output pointer generator includes a counter clocked by the local clock.

13. The device of claim 7, wherein the input pointer generator includes a shift register clocked by the bus clock.

14. The device of claim 7, wherein the input buffer includes N registers having respective clock inputs connected to receive bus clock, data inputs connected to receive bus data, and enable inputs connected to the input pointer.

15. The device of claim 14, wherein the input pointer generator includes a shift register clocked by the bus clock and having N outputs connected to the enable inputs of respective registers in the input buffer.

* * * * *